Oct. 30, 1962 H. F. MISEROCCHI 3,061,476

METHOD OF MAKING THERMISTOR BOLOMETERS

Original Filed April 1, 1958 2 Sheets-Sheet 1

INVENTOR.
HENRY F. MISEROCCHI
BY
Robert Ames Norton
ATTORNEY

INVENTOR.
HENRY F. MISEROCCHI
BY
Robert Ames Norton
ATTORNEY 3,061,476

METHOD OF MAKING THERMISTOR BOLOMETERS

Henry F. Miserocchi, Old Greenwich, Conn., assignor to Barnes Engineering Company, Stamford, Conn., a corporation of Delaware

Original application Apr. 1, 1958, Ser. No. 725,553. Divided and this application Apr. 4, 1960, Ser. No. 19,890
6 Claims. (Cl. 117—212)

My invention relates to an improved process of preparing thermistor bolometers. More particularly, the invention relates to a process which permits the production of arrays or mosaics of bolometers. The process produces improved thermistor bolometers which are bonded to a backing block with a fused layer and without the use of cements or adhesives.

Thermistor bolometers are devices which are sensitive to infra-red radiant energy, and thus may be used for making temperature measurements by measuring the infra-red energy emitted from an object. In general, they comprise a thermally sensitive resistor of semi-conductor material mounted on a thermally conductive supporting structure which serves as a heat sink. In use this resistor is positioned so that infra-red radiation from an object whose temperature is to be measured falls thereon. Optical type means may be employed to collect and focus the infra-red rays, in any desired manner or pattern, to concentrate the energy on one or more thermistor bolometers. The thermally sensitive resistor may be in the form of a bead mounted on a glass support, or, more recently, in the form of a sintered flake of semi-conductive material supported on a thermally conductive backing block. In this latter construction a small thin flake of sintered semiconductor resistance material is mounted on a relatively large massive block which conducts heat away from the flake. The heat conductive backing block improves the time constant of the bolometer by increasing the speed at which the bolometer will respond to changes in the infra-red radiation falling thereon.

In the manufacture of flake bolometers, prior to my invention the flake has been manufactured separately from the backing material and then cemented or otherwise secured to the backing block. Because the flakes are very small and fragile they require careful handling. However, even with the greatest care, many flakes are inevitably broken in manufacture, and thus the process of bolometer manufacture by this method is a time-consuming and expensive one. Attempts have also been made in the past to manufacture thermistor bolometers in which the necessary sintering of the flake is accomplished with the thermistor material in place on the backing block, in the hope that the flake would bond directly to the backing material. However, such prior attempts have been unsuccessful due to the failure of the thermistor flake material to form an enduring bond with the surface of the backing material.

Accordingly, the construction in which the thermistor flake is cemented to the backing block has heretofore come to be the preferred method of bolometer manufacture. However, using this method in which each flake of thermistor material is separately attached to the backing material, large arrays or mosaics of very small flakes mounted on a single piece of backing material are extremely expensive and generally impractical to manufacture. The primary utility of multiple arrays of thermistor bolometers is to provide a "heat picture" of an area, each element of the mosaic responding to the intensity of infra-red radiation from a particular small area of the scene which the mosaic is facing. When appropriate bias potentials are applied to the thermistor elements in such a mosaic, the signals generated by these individual elements may be combined to form a "heat picture" in the same manner as electrical signals from individual light sensitive elements of a television camera are combined to form a television picture. Prior attempts to produce thermistor mosaics have been generally unsatisfactory because the individual flake size could not be reduced sufficiently to obtain high resolution, since the thermistor flake size was limited by the minimum size which could be handled during manufacture. Hence, arrays having an extremely large number of very small thermistor flakes have been unobtainable heretofore.

Accordingly, one of the objects of my invention is to provide a practical method for the manufacture of multi-element infra-red sensitive detectors in which a large number of small but discrete sensing elements may be formed together in a closely spaced array or mosaic of any desired configuration.

A more general object of the invention is to provide an improved heat sensitive detector element in which the thermally sensitive portion is secured to a backing material without use of cement, and yet adheres strongly thereto because of inherent bonding between a surface boundary layer of the thermally sensitive material and a surface boundary of the backing material.

A further object of the invention is to provide infra-red sensitive thermistor bolometers of the type described having fast response speeds and high responsivity; i.e., devices which provide a large variation in electrical signals for a given change in infra-red radiation impinging thereon.

A still further object of the invention is to provide mosaics of thermistor bolometers of the character described which are arranged to be responsive to particular wave lengths of dispersed infra-red energy.

Still another object of the invention is to provide a method for making bolometers of the character described in which the thermally sensitive material and the backing material inherently bond together.

A still further object of the invention is to provide a method of the character described which is adapted to make arrays and mosaics of thermistor bolometers.

Yet another object of the invention is to provide a method of the character described which is relatively simple and more economical to practice, and yet produces uniform bolometers which are of high quality. Other objects of the invention will in part be obvious and will in part appear hereinafter.

The invention accordingly comprises the several steps and the relation of one or more of said steps with respect to each of the others, and the article possessing the features, properties, and the relation of elements which are exemplified in the following detailed disclosure; the scope of the invention will be indicated in the claims.

For a fuller understanding of the nature and objects of the invention, reference should be had to the following detailed description taken in connection with the accompanying drawings in which:

FIGURE 5 is an enlarged top plan view of an array of closely spaced thermally sensitive resistance strips arranged to provide equal output signals for an infra-red spectrum dispersed by a rock salt crystal or the like.

Figure 1:
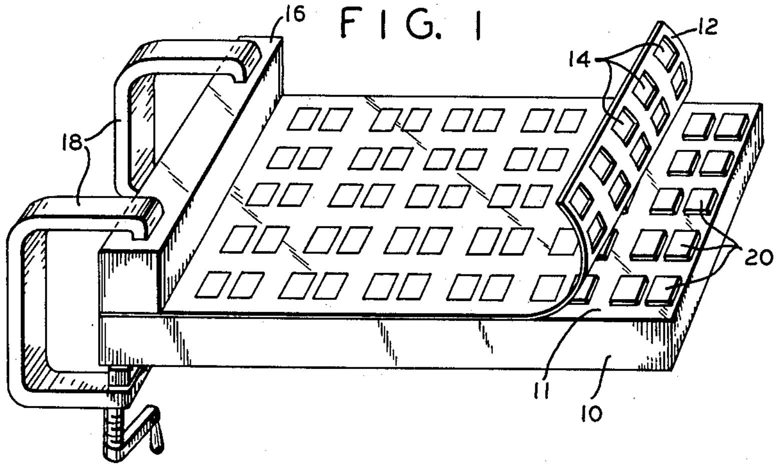
FIGURE 1 is a perspective view showing one embodiment in which a thin mask is attached to a plane backing block to form a plurality of thermistor bolometers according to the method of the invention.

Referring now in greater detail to FIGURE 1 of the drawings, one manner of practicing the invention will be described in detail. Here is shown a backing member 10 of thermally-conductive, electrically-insulating refractory material which may be, for example, either of aluminum oxide, beryllium oxide, or magnesium oxide. Excellent results according to the invention have been obtained with vitreous alumina which contains a small amount of silica; the specific proportions having been found to be quite effective are 96 percent $Al_2O_3$ and 4 percent $SiO_2$. In FIGURE 1 the upper surface 11 of the refractory backing member 10 has been ground flat to form a smooth plane surface which is flat to within 0.0003 per inch. For best results in forming a mosaic of thermistor bolometers, I have found such a plane flat surface to be desirable, although it is to be understood that the surface need not be ground optically flat, and in many other embodiments the surface of the backing member need not be flat at all but may be a smooth cylindrical surface, or a smooth curved surface of any other desired configuration, as for example a portion of a spherical surface, or a parabola. It will be understood that the thickness of the refractory backing member 10 is in no sense critical, but may be chosen of any convenient dimension commensurate with mechanical rigidity and the requisite thermal-conductivity and heat dissipation required of a good sink. To assure a relatively short time constant for each of the bolometer elements, the thermal diffusivity of the backing member 10 should be large compared to the thermal diffusivity of each of the thermistor elements 20, it being understood that thermal diffusivity is the thermal conductivity divided by the heat capacity per cubic centimeter.

Over the smooth surface 11 of the refractory backing member 10 is placed a thin mask 12 through which have been pierced or etched a plurality of apertures 14 in any desired configuration. The mask 12 may be of any suitable material of uniform thickness, as for example a plastic material such as "Mylar," or if desired the mask may be formed of metal such as, for example, stainless steel, brass, lead, copper, or aluminum. The thickness of the mask merely determines and assures a uniform thickness of thermistors deposited on the refractory base 10, and this thickness of thermistor material 20 in turn influences the characteristics of the bolometers, as is well known in the art.

For various applications the thickness of the mask 12 may be selected anywhere from 10 microns to 100 microns or more. For one specific application I have used a plastic mask of "Mylar" having a thickness of .001 inch (100 microns), which after the firing operation to be described hereinafter leaves a thermistor deposit of approximately 80 microns. The mask 12 is firmly secured to one edge of the backing block 10, as shown in FIGURE 1, by a gripping bar 16 and a pair of C clamps 18—18. It will be understood, however, that the manner of securing the mask to the backing block is immaterial to the invention, so long as there is no possibility of slippage or leakage between the mask and the back during the process of applying the prepared thermistor material.

A paste or grease-like emulsion of thermally-sensitive, variable-resistance, electrically-conductive material is next prepared by starting with a mixture comprising either 85 percent maganese oxide ($Mn_2O_3$) and 15 percent nickel oxide (NiO) or 68 percent manganese oxide, 16 percent cobaltic oxide ($Co_2O_3$) and 16 percent nickel oxide, all thoroughly and uniformly mixed. This mixture is then blended with an oil vehicle, which may be any one of the oils generally known as "squeegee" oils, which are the same as or similar to the oils used in making enamel frits. For this step I prefer a printing oil which is sold under the trade name of "Drakolene" manufactured by B. F. Drakenfeld. The material taken from the ball mill and the oil are mixed to a thick consistency comparable to that of axle grease or printer's ink.

This ink-like mixture is then spread uniformly over the mask 12 and in through the apertures 14 onto the surface 11 of backing member 10. With a plane flat surface, such as is illustrated in FIGURE 1, this uniform spreading may be effectively accomplished by means of a straight edge, as for example a lapped edge knife blade. It is important that all excess materials be scraped from the surface of the mask, and that the residual deposits in the apertures 14 be of uniform thickness. It is to be understood, however, that in applying this material to curved surfaces, rather than to a flat plane surface, other means may be employed to assure the uniform thickness of the material deposit.

The refractory backing block 10 thus prepared is next placed in a furnace where it is subjected to heat at a temperature of approximately 1150 to 1250 degrees C. for a period of from approximately five minutes to ten minutes, whereupon the specially prepared thermally-sensitive, variable-resistance electrical material is sintered in place on the surface of the backing block 10 and is fused thereto through inherent surface bonding therebetween. Preferably the mask 12 should be removed from the surface of the backing member 10 before this firing operation is performed, in order to prevent destruction of the mask if it is made of plastic material, and to prevent distortion of the thermistor arrays if a metal mask has been used which may have a different coefficient of expansion from that of the backing block 10. An alternative method in which a destructible "negative mask" is employed will be described hereinafter.

After removal from the firing oven, the backing refractory member 10 has formed thereon a plurality of thermistor elements as illustrated at 20 in FIGURE 1. The necessary electrical connections to each of the individual thermistor elements 20 may then be made by any suitable means. I have found that a most convenient and expeditious manner for making electrical connections is by a form of "printed circuit" technique which entails simply depositing an emulsion of finely divided metal in a fluid vehicle wherever desired on the surface 11 of the backing member 10, at positions to contact edge areas of the thermistor elements 20. This technique is especially useful for making contact to the individual thermistors 20 in a large mosaic or array where the individual elements are closely spaced.

A mask is prepared with apertures designed to correspond dimensionally with the desired locations for the electrical conductors, and this mask is then placed over the face 11 and the thermistor elements 20 on the backing member 10. An emulsion of finely-divided metal (which preferably may be either gold, silver, or platinum) and fluid vehicle is then applied to the face of the mask. This application may be made either by brushing, spraying, or evaporating in a vacuum, in which latter case the fluid vehicle is unnecessary. The mask is then removed and the treated assembly is again placed in a furnace and heated to a temperature of approximately 760 degrees C. for a short period (which may be approximately three minutes) to evaporate the fluid vehicle from the suspended precious metal and leave a thin conductive deposit of the metal conductor on the surface 11 of the refractory base 10 and in contact with the selected edges of the several thermistor elements 20.

Where it is necessary or desirable to bring out a plurality of separate connections insulated from each other, this may be done from the bottom surface, through holes in the refractory base 10. Wires may be inserted through such holes, or the holes may be filled with either powdered or emulsified precious metal prior to the firing of the surface printed emulsion, in which latter case conductors through the base 10 are formed simultaneously with the formation of conductors on the surface 11. The formation of these conductors, and their relation to the backing member 10 and the thermistor elements 20 is shown in the greatly-enlarged cross section view of FIGURE 2.

Figure 2:
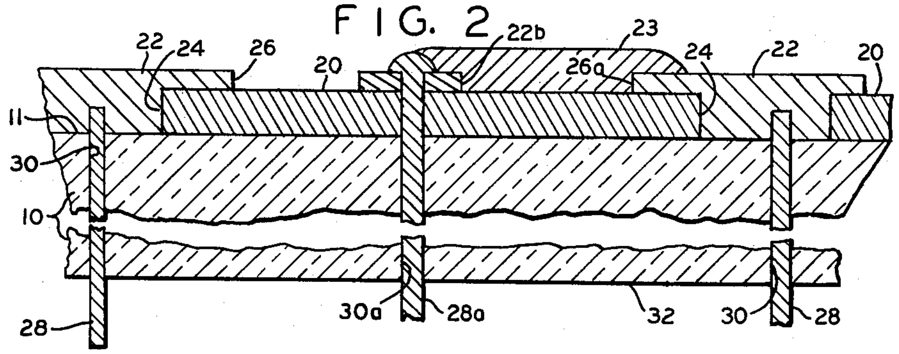
FIGURE 2 is an enlarged fragmentary vertical cross section through an improved thermistor bolometer made according to the invention.

Referring now in greater detail to FIGURE 2, it will be seen that the conductive buses 22 and 22A of precious metal deposited on the surface 11 of refractory base member 10 engage the opposite peripheral edges 24—24 of the thermistor element 20 and overlap the top surface of the thermistor 20 as shown by the portions of conductive buses 22 and 22A at 26 and 26A. Conductive pins 28 of precious metal may be passed through holes 30 in the base member 10 before formation of the buses 22 and 22A to provide an external lead from the opposite face 32 of base member 10.

Figure 3:
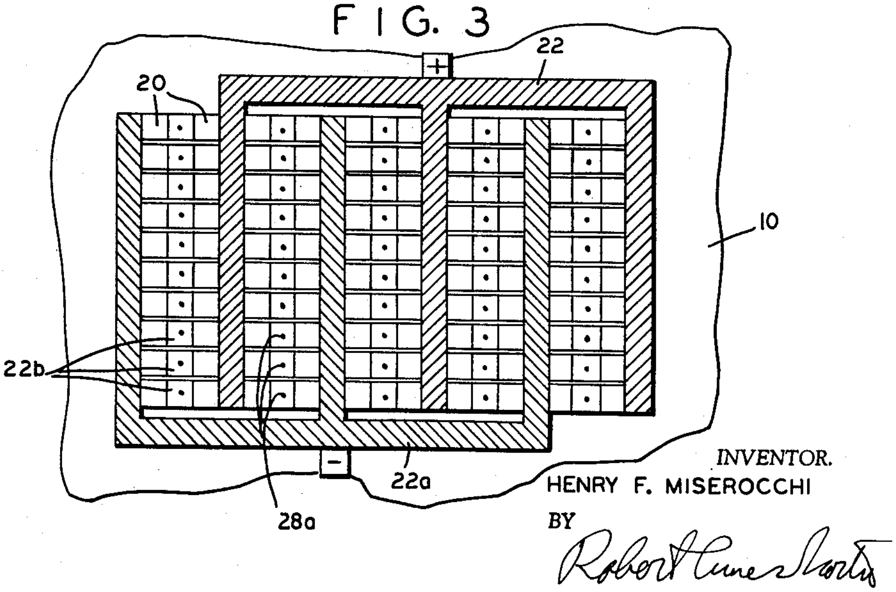
FIGURE 3 is a top plane view showing the manner of attaching electrodes to the thermistor array made by the method disclosed in FIGURE 1.

Another electrical conductor 28*a* passes through the insulating substrate member 10 into conductive engagement with the central portion of the variable resistance thermistor element 20 by way of a conductive layer 22*b* thereon as shown in FIGURES 2 and 3. If desired, a coating of infra-red reflective heat insulating material 23 may be added to cover approximately one half of the thermistor element 20, as shown in FIGURE 2, adapting the two halves of the element 20 to be connected in a balanced bridge circuit for sensitive indication of radiation incident upon the uncoated half of the thermistor 20.

FIGURE 3 illustrates the general appearance of a portion of a thermistor array as formed according to the disclosure of FIGURE 1, and as here viewed from the top after the conductive buses 22 and 22A have been applied in engagement with the plurality of thermistor elements 20. It will be understood within the art that if it should be necessary or desirable to provide overlapping conductors on the face of an array, with separate layers of conductive buses insulated from each other, this may readily be accomplished by coating the exposed surfaces of the first-formed conductors 22 and 22A with a suitable insulating lacquer and by then printing a second layer of conductive material, in any desired pattern, thereover. In like manner, or alternatively, any desired pattern of interconnections may be made between the conductive pins, such as pin 28 in FIGURE 2, by depositing a pattern of conductive buses on the bottom surface 32 of refractory base 10 as seen in FIGURE 2.

A rectilinear array of thermistors, as described above, may be employed to detect a heat image, and the different electrical signals obtainable from each of the closely-spaced very small thermistor elements may be combined to form a "heat picture." Various means suitable for scanning such an image are available, and do not form a part of the present invention.

Figure 5:
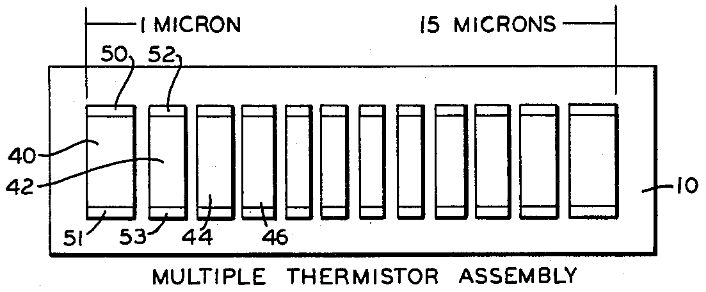

Another useful form in which the invention may be employed is that of a linear array such as illustrated generally in FIGURE 5. Here a plurality of strip-shaped thermistors 40, 42, 44, 46, etc., have been bonded to the face of refractory backing member 10 in closely spaced relation but insulated from each other. Electrical connections are made at the opposite ends of each thermistor strip, as at 50—51, and 52—52. By forming the thermistor strips of varying widths, the sensitivity of each thermistor will differ from those adjacent to it. By arranging the order of varying strip widths to correspond to any predetermined wave band of infra-red spectrum or any portion thereof, an array such as shown in FIGURE 5 may be designed to produce equal outputs from each thermistor strip when the array is exposed to such predetermined spectrum dispersal of infra-red energy.

Figure 4:
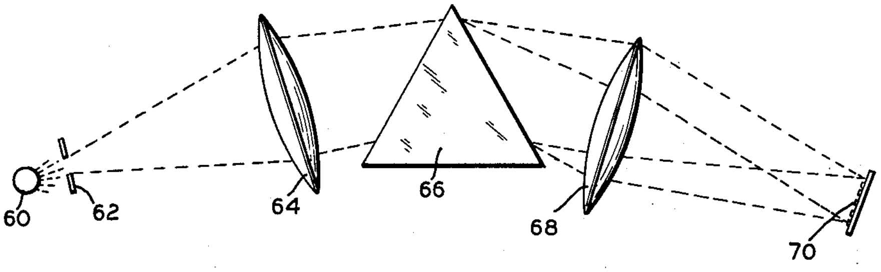
FIGURE 4 is a schematic diagram of an optical system showing the manner in which a band of infra-red energy may be dispersed for spectral analysis by means of the invention.

A simple optical system suitable for dispersing rays of infra-red energy into a spectrum suitable for spectral-analysis by a thermistor array as shown in FIGURE 5 is illustrated schematically in FIGURE 4 where a source of infra-red radiant energy is represented at 60. Rays of infra-red energy from source 60 are passed through a narrow slit plane exit 62 to a collimating lens 64 which directs the rays along substantially parallel paths to a prism 66 which diffracts the rays, according to their differences in wave length. The diffracted rays from prism 66 are then focused by lens 68 onto a linear thermistor array 70. Alternatively, if it should be desired to produce a variable indication in the output in accordance with a predetermined spectrum of infra-red energy dispersal, the thermistor strips in FIGURE 5 may be made of uniform width, or they may even be formed of inversely varying widths, or of any desired combination and sequence of widths, to produce a desired gradation of signal outputs.

Where it is desired to form an array comprising a plurality of thermistor elements of such size and close spacing that a positive mask as described above is too weak structurally to maintain the desired configuration between apertures, I have found a negative masking technique to be most effective. In this modification of the process a mask is prepared by piercing, etching, or otherwise forming a sheet of masking material (preferably stainless steel) with apertures designed to correspond dimensionally with the desired locations of spaces to be left between thermistor elements. This mask is then placed over the smooth surface of a refractory backing member, and a mixture of finely divided graphite with epoxy resin is applied to the surface of the refractory member through the apertures of the mask. While the proportions of this mixture are not critical, I have found a blend of about five percent epoxy with 95 percent carbon black to be very satisfactory. The assembly, either with or without the mask, is then heated in a low temperature oven to "set" the epoxy resin, whereby the graphite is bonded to the surface of the refractory member in a pattern corresponding to the configuration of apertures in the mask. In this way a pattern of rigid "lands" of uniform thickness is deposited on the surface of the refractory member. Now a prepared mixture of semi-conductor material, as herein described, can be uniformly applied to the surface of the refractory member, and discrete deposits of this material are separated from each other by the "lands" of molded epoxy and graphite. When the thus prepared base member is returned to a higher temperature furnace, for sintering and bonding of the thermistor material onto the surface of the refractory base, these "lands" of epoxy bonded graphite burn off and disappear as furnace gases leaving the discrete deposits of thermistor material closely spaced but electrically insulated from each other. This method of forming a negative mask is necessary wherever the required length-to-width separation between thermistor elements is of the order of 10:1 or greater, and where the desired spacing between adjacent elements is of the order of a few microns. By means of this technique I have successfully manufactured thermistor arrays in which the spacing between thermistor elements is only 0.004 inch and the longest dimension of the elements is 0.320 inch. This method of closely spacing thermistor elements in an array may be employed either in the manufacturing process described above or in a modified process, to be described hereinafter, wherein the semi-conductor thermally sensitive material is presintered before being bonded to the refractory base member.

Having described my basic method of producing thermistors either as individual elements, arrays, or mosaics, I shall now describe a modification of this method which I have also found to be quite useful in producing devices of the same class but with particular characteristics as may be desired for certain applications. If it is desired to lower the internal resistance of each individual thermistor element, and one reason that this may be desirable is to reduce the internal noise so that the signal outputs from the several units may be subjected to a high degree of amplification, I have found it advantageous to pre-sinter the thermally sensitive variable resistance electrical conductive material before applying is to the insulating refractory base member.

In this modification of the process I start with a mixture of the oxides of manganese and nickel, either with or without cobaltic oxide, in the proportions described above, and I subject a uniform mixture of this powdered material to heat treatment at a temperature of approximately 1200 degrees centigrade for a period of approximately ten minutes. This heat treatment effects partial sintering of the material and produces some caking of the powders. Consequently, after following this initial step, I re-grind the pre-sintered material, as for example, by placing it in a ball mill, until it is again in a finely powdered state. Next, I separate this re-ground material to select only those particles which are no larger than one micron, and preferably smaller than this. Then these selected finely ground powders are blended with a volatile oil vehicle to form a paste having the consistency of thick grease or printer's ink. This paste is then uniformly applied to the smooth surface of a refractory backing member, either directly through a mask or through one prepared from a negative mask as described above, as hereinabove described with reference to the first method. The refractory base member with the material thus applied is then placed in an annealing furnace where it is heat treated at a temperature of from 350 to 900 degrees centigrade for a period of 60 to 70 hours.

If it is not imperative that the resistance of the thermistor elements be as low as possible, this time of annealing may be reduced somewhat. However, as indicated above, a low resistance is generally considered desirable as a means of reducing the internal noise. I have found that the resistivity of these thermistor elements continually drops as the time of annealing progresses, up to approximately 60 hours. Therefore, I prefer to continue the annealing for approximately 70 hours in order to obtain as low an internal resistance as possible with the given material. It will be understood, of course, that the time required for annealing may vary somewhat depending upon the choice and proportions of oxides selected as starting materials, and also upon the thickness of the deposit.

By this method I have produced very useful mosaics of thermistor elements all uniformly and securely bonded to a base member of vitreous alumina backing material, and having the following characteristics: element size, one by one millimeter; resistance at 25 degrees centigrade, 0.5 megohm; noise, less than 1.2 times Johnson noise; (noise approximately 0.9 microvolt for 100 c.p.s. bandwidth); time constant, 2–4 milliseconds; responsivity, 140 volts per watt at 0.6 peak voltage; noise equivalent power for 100 c.p.s. bandwidth approximately $6 \times 10^{-9}$ watts. Detailed structural analysis of these thermistor elements has disclosed the structural characteristics illustrated in FIGURE 6.

Figure 6:
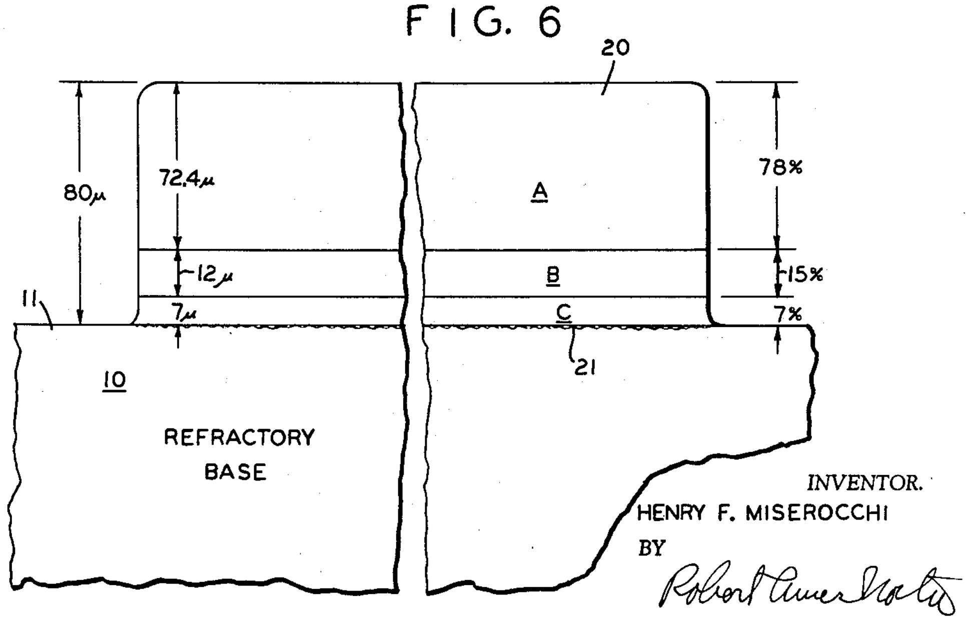
FIGURE 6 is a partial cross sectional view, greatly enlarged, of a single thermistor element formed by the method of the invention.

Referring now to FIGURE 6 of the drawing, which represents a greatly enlarged cross sectional view of a single thermistor element 20 inherently bonded at boundary layer 21 to the smooth surface 11 of refractory base member 10; it will be seen that in this representative example the thermistor element 20 is 80 microns thick. In this case the emulsion of resistance material was applied to the base member through a mask which was 100 microns in thickness, so that before subjection to heat treatment the paste material was also 100 microns thick. The reduction in final thickness of the thermistor element 20 is due to inherent shrinkage which accompanies evaporation of the oil vehicle and further sintering of the resistance material. The upper 78 percent (A) of the finished thermistor element was found to be comprised of a substantially uniform mixture comprising 68% magnesium oxide, 16% nickel oxide, and 16% cobaltic oxide and having a resistivity of 800 ohm centimeters. Immediately below this portion was a layer (B) of substantially the same composition approximately 12 microns in thickness (representing 15% of the total thermistor thickness) which displayed a resistivity of 2000 ohm centimeters. At the bottom of the thermistor element 20 was found a layer (C) of similar composition approximately 7 microns in thickness (representing 7% of the total thermistor thickness) which was securely bonded to the surface of the refractory base member and which displayed a resistivity of $4 \times 10^9$ ohm centimeters. It should be noted, however, that the combined depth of the two higher resistance layers (B) and (C), which averages about 19 microns in thickness, remains substantially constant regardless of the over-all thickness of the complete thermistor element.

Experimental evidence indicates that in the sintering of these semi-conductor oxide materials, whether the material be entirely sintered in place as by my first method or whether it be partially pre-sintered as in the second method, some of the oxygen which is driven from the material during the initial stages of heat treatment is partially restored during the final stage of annealing. There is also evidence at the interface boundary, between the thermistor element and the refractory base, that some molecules of aluminum oxide as well as molecules of silicon oxide migrate from the surface of the base member into the adjacent surface layer of the thermistor material, and it is believed that this molecular migration and the resulting inter-molecular attraction is responsible for the firm and enduring bond which is effected between the thermistor material and the refractory base material.

While the example described above with reference to FIGURE 6 was made with a starting material containing equal percentages of nickel oxide and cobaltic oxide, it is to be understood that the percentage composition of the starting mixture may be varied to produce thermistor elements of different characteristics, as may be desired, and that other metallic oxides, as for example iron oxide, may be included in the mixture. By the methods of the invention I have produced equally useful thermistor arrays in which the thermal sensitive elements were formed of approximately 85% manganese oxide and 15% nickel oxide.

In producing an experimental 100 element mosaic according to the invention, a $10 \times 10$ matrix of 1 millimeter by millimeter elements were spaced 0.2 millimeter apart, electrical connections being made to the individual elements through printed gold buses on the surface of the mosaic. The individual elements of the array were found to have substantially uniform resistance and responsivity, to within plus or minus 5%; and with uniform time constants averaging 3 milliseconds, plus or minus one millisecond. It should be understood, however, that the size and spacing of the individual elements need not be limited to the one by one millimeter size of this example, but that by the techniques herein disclosed the dimensions of these elements can actually be reduced to one tenth this size. Likewise, by varying the element thickness, and choice of ceramic substrate, the time constant of each element can be reduced to less than one millisecond, or, if desired, may be increased to as much as 8 or 10 milliseconds, while maintaining uniformity of quality characteristics throughout.

While the description thus far has been with reference to the production of thermistor arrays, which may be in any desired pattern, it is to be understood that the invention is not limited to the manufacture of thermistor arrays and mosaics, but the invention may also be employed for the manufacture of individual thermistor elements, or pairs of elements, as thermistor bolometers. Thus it will be apparent that the cost of producing individual thermistor bolometers of uniformly high quality and closely controlled production characteristics may be greatly reduced by forming a substantially large number of such elements simultaneously on a unitary backing member which, after formation of the thermistor elements, may be divided into separate bolometer elements by cutting or otherwise dividing the base member. Or, if desired, a plurality of individual base plates may be aligned on a suitable support to receive deposits of semi-conductive thermally sensitive material prepared as described above and applied through a prepared mask as herein disclosed, and then the mass of prepared elements may be simultaneously subjected to the heat treatment herein prescribed.

It is to be understood that the methods herein disclosed, and the articles of manufacture produced thereby, may be varied in many details within the scope of the invention. For example, where it may be desired to produce extremely closely spaced thermistor elements inherently bonded to a refractory backing member, various negative masking techniques may be employed to build up narrow lanes of insulating material on the surface of the refractory base member before applying an emulsion of resistance material as herein disclosed. Also, the methods of the invention may be adapted to continuous processes for the mass production of low cost, high quality thermistors according to the invention.

It will thus be seen that the objects set forth above, among those made apparent from the preceding description, are efficiently attained, and since certain changes may be made in carrying out the above method and in the article set forth without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

This application is a division of my co-pending application Ser. No. 725,553, filed April 1, 1958, now abandoned.

I claim:

1. A method of manufacturing a thermistor bolometer which comprises (*a*) applying to a smooth surface of an electrically insulating backing block of high heat conductivity selected from the group consisting of aluminum oxide, beryllium oxide and magnesium oxide, thermistor material consisting predominantly of manganese oxide with minor amounts of an oxide selected from the group consisting of nickel oxide and cobalt oxide, the thermistor material being distributed in a predetermined pattern, (*b*) firing the block at a temperature to sinter the thermistor material to form thermistors and to form a fused bonding layer between thermistor and backing block which is longitudinally electrically homogeneous.

2. A method according to claim 1 in which an apertured mask of predetermined thickness is applied to the surface of the backing material and thermistor material is deposited in openings in said mask to produce a predetermined pattern or array.

3. A method according to claim 2 in which the thermistor material is applied in the form of a paste of thermistor forming metallic oxides and a vehicle volatile at firing temperatures.

4. A method according to claim 2 in which the mask is of metal and after depositing thermistor material the mask and backing block are subjected to heat sufficient to set the thermistor material, the mask is removed and the block and thermistor material fired.

5. A method according to claim 2 in which the mask is transformable into gas at the temperature of firing and is retained in place until destroyed in the firing step.

6. A method according to claim 1 in which the refractory backing block is vitreous alumina.

References Cited in the file of this patent

UNITED STATES PATENTS

| | | |
|---|---|---|
| 395,963 | Edison | Jan. 8, 1889 |
| 2,329,511 | Christensen | Sept. 14, 1943 |
| 2,414,792 | Becker | Jan. 28, 1947 |
| 2,542,726 | Sullivan | Feb. 20, 1951 |
| 2,849,583 | Pritikin | Aug. 26, 1958 |
| 2,886,476 | Dumesnil et al. | May 12, 1959 |

FOREIGN PATENTS

| | | |
|---|---|---|
| 421,489 | Great Britain | Dec. 21, 1934 |
| 470,921 | Great Britain | Aug. 24, 1937 |